Feb. 16, 1971 W. T. BERGSTROM 3,563,672
PUMP CONTROL SYSTEM
Filed Jan. 14, 1969 3 Sheets-Sheet 3
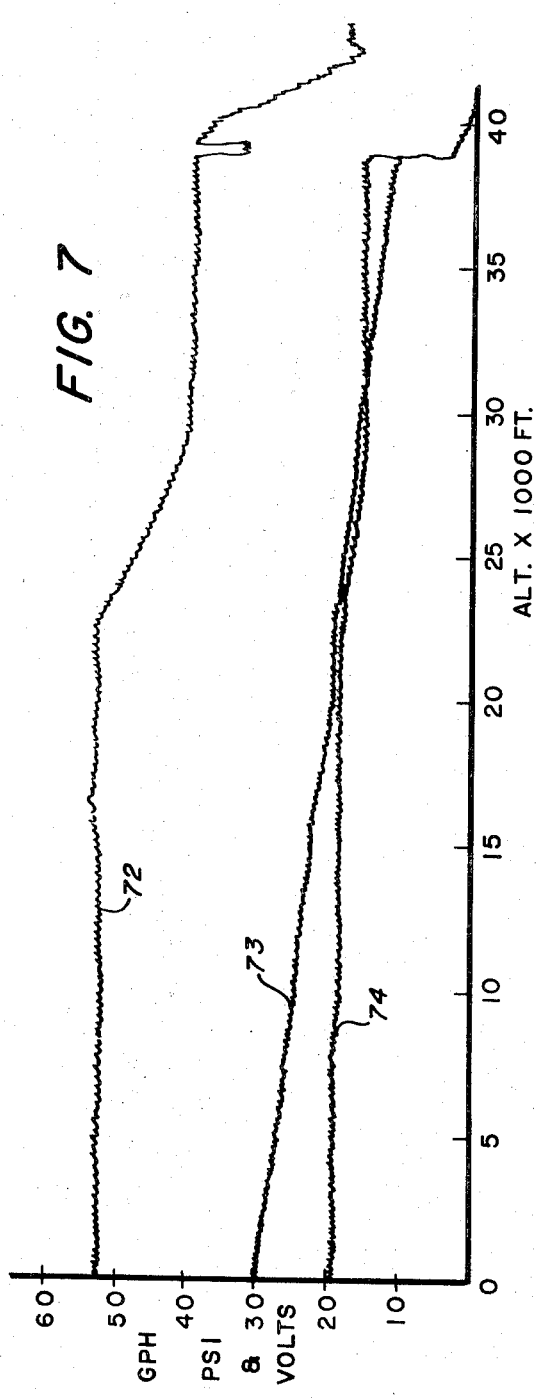
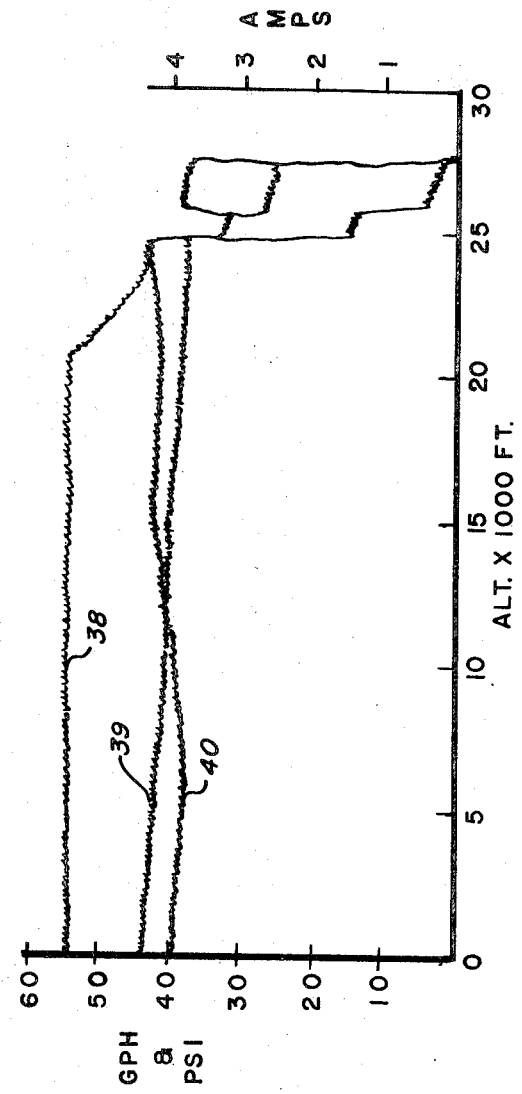
INVENTOR.
WALTER T. BERGSTROM

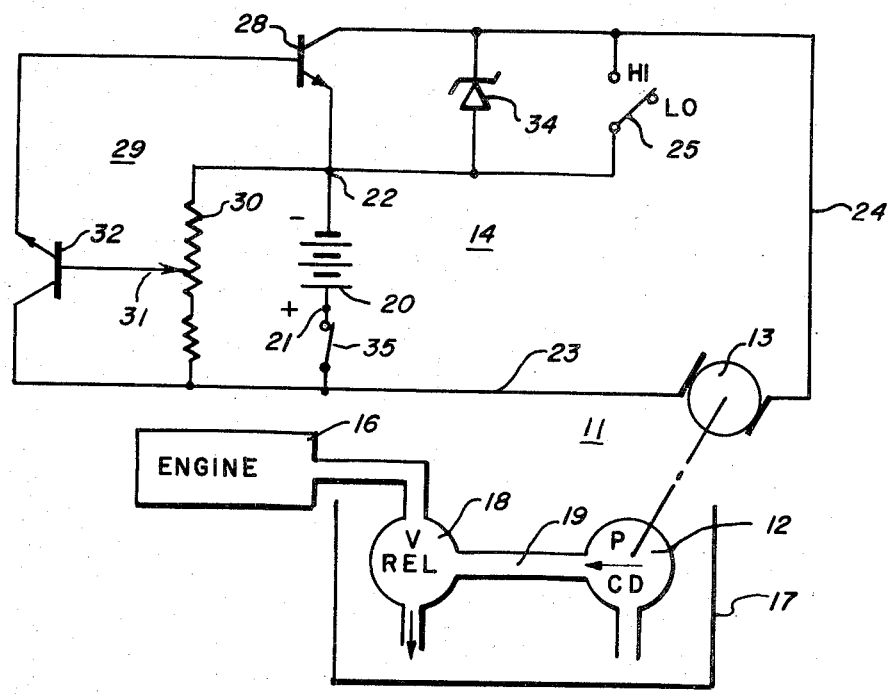
FIG. 1
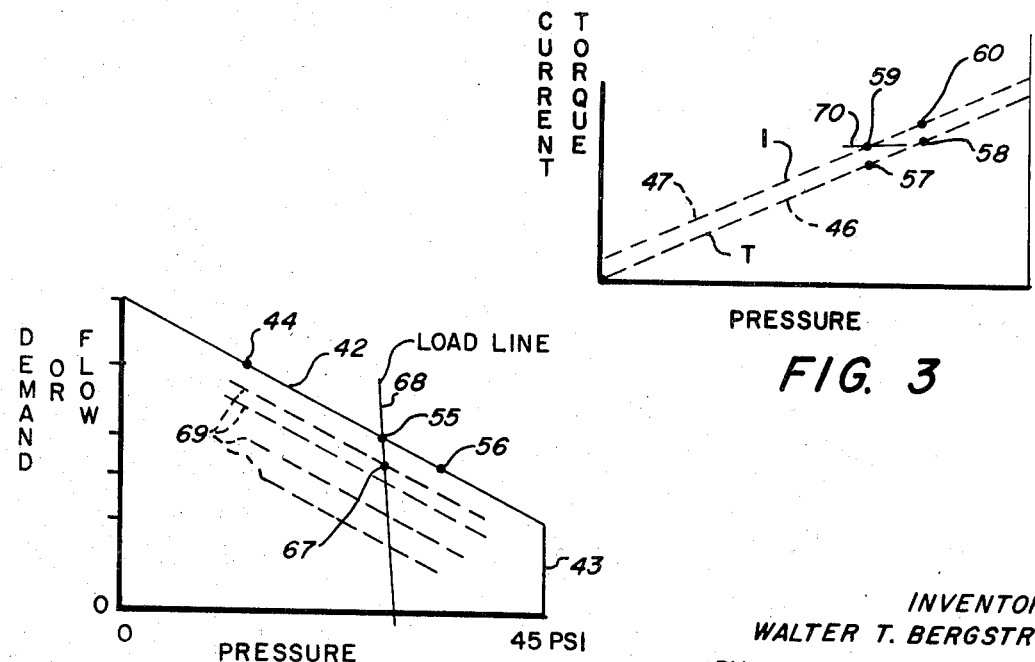
FIG. 3
FIG. 2
INVENTOR.
WALTER T. BERGSTROM

United States Patent Office 3,563,672
Patented Feb. 16, 1971

3,563,672
PUMP CONTROL SYSTEM
Walter T. Bergstrom, Chagrin Falls, Ohio, assignor to
The Weldon Tool Company, a corporation of Ohio
Filed Jan. 14, 1969, Ser. No. 790,924
Int. Cl. F04b 49/06
U.S. Cl. 417—45                                 28 Claims

ABSTRACT OF THE DISCLOSURE

A fluid pump is driven by an electric motor and has an increasing fluid output with increasing motor and pump speed and the electric motor has increasing speed with increasing applied voltage. An electrical circuit is connected for driving and controlling the motor and is responsive to an increase in pressure on the outlet side of the pump to cause a decrease in motor applied voltage to thus reduce the motor speed and the fluid output of the pump. The foregoing abstract is merely a résumé of one general application, is not a complete discussion of all principles of operation or applications, and is not to be construed as a limitation on the scope of the claimed subject matter.

BACKGROUND OF THE INVENTION

The Federal Aviation Authority requires that aircraft fuel pumps have capacities exceeding the actual flow rate required by the engine. A pressure relief valve bypasses the flow not used to the sump. There is no major penalty incurred by this operation during operation of the aircraft from sea level to 10,000 or 15,000 feet altitude. However as the altitude increases the decreased atmospheric pressure causes vaporization in the fuel at temperatures in the fuel being pumped and it becomes increasingly important that the pumping mechanism be operated in a manner that will make a minimum contribution to the vaporization tendency.

The prior aircraft fuel pumps have usually been of the positive displacement type to comply with requirements. As the aircraft engine is throttled back, this increases the back pressure on the fluid being pumped and the relief valve came increasingly into use to bypass the excess fuel. Thus as the aircraft reached cruising altitude, the throttling back plus the reduced atmospheric pressure at the cruising altitude both combine to cause considerable problems in the vaporization of the fuel. Accordingly, an object of the invention is to provide a pump control system to obviate the above-mentioned disadvantages.

Another object of the invention is to provide a pump control system which tends to hold the output pressure at the pump outlet substantially constant despite changes in demand.

Another object of the invention is to provide a pump control system which tends to maintain substantially constant current to the electric motor driving the pump despite changes in demand of the fluid flow.

Another object of the invention is to provide a pump fluid control system which has both a high and low setting with the high setting complying with The Federal Aviation Authority requirements and the low setting maintaining a pressure below that at which the pressure relief valve bypasses fuel to thus eliminate this source of heating agitation and vaporization of the fuel.

Another object of the invention is to provide a pump control system which automatically regulates the delivery of the pump without any electrical feedback signal from the motor or other load.

Another object of the invention is to provide a pump control system wherein a semi-conductor is used responsive to a bias voltage to change the fluid output of the pump in response to changing fluid flow requirements.

SUMMARY OF THE INVENTION

The invention may be incorporated in a fluid pump control system therefor including, in combination, a pump having an inlet side and an outlet side, said pump having an increasing pumped displacement with increasing speed, conduit means at the outlet side of said pump for transporting fluid to a load, an electric motor connected to said pump for driving the same, said electric motor having a decreasing speed with a decreasing applied voltage, and electrical circuit means for driving and controlling said motor including first means responsive to an increase in pressure at said outlet side of said pump to cause a decrease in motor applied voltage thereby reducing motor speed.

Other objects and a fuller understanding of the invention may be had by referring to the following description and claims, taken in conjunction with the accompanying drawings.

BRIEF DESCRIPTION OF THE DRAWINGS

FIG. 1 is a schematic diagram of a system embodying the invention;

FIGS. 2–5 are graphs plotted against pressure to indicate performance of the system; and FIGS. 6 and 7 are graphs plotted against altitude to illustrate performance of the system.

DESCRIPTION OF THE PREFERRED EMBODIMENT

Figure 4:
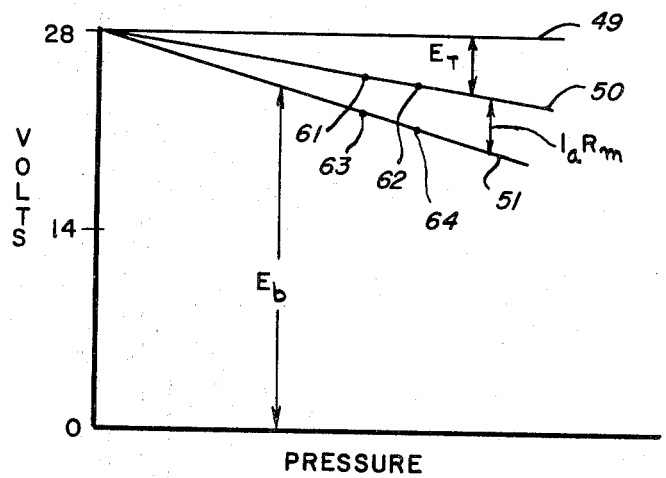

FIG. 1 illustrates a schematic diagram of one form of the invention showing a pump control system 11 including generally a pump 12, an electric motor 13, and an electrical circuit 14. The pump 12 is a fluid pump of the type which has an increasing pumped displacement with increasing speed of operation. In the preferred embodiment this is a positive displacement pump or as sometimes called a constant displacement pump, but generally this is true only in the sense of a constant displacement per revolution or per cycle of actuation. Such pumps may take the form of a piston pump or diaphragm with a constant stroke. Such preferred type of pump has an essentially linear pressure-torque relationship over a wide speed range. The pump may be adapted for coolant systems, hydraulic systems or other uses, but has been shown as a fuel boost pump such as for use in aircraft having an engine 16 which is representative of many forms of loads. The fluid load on the pump 12 is one which has variable requirements and accordingly has changing back pressures specifically one which has an increasing back pressure with decreasing fluid requirements received from the pump 12. The pump 12 may be submerged within a tank 17 which tank also acts as a sump to which excess fluid is diverted by a pressure relief valve 18 should the pressure exceed a preset maximum. The pump outlet is through a conduit 19 to the engine 16, with the relief valve 18 also connected to the pump outlet.

The electric motor 13 is operable from a voltage source 20 in this case a DC source. The electric motor 13 is one which has an increasing speed with an increasing applied voltage. One such preferred motor is one having shunt motor characteristics which has an essentially linear or flat torque-speed relationship over a wide range of speeds with a minimum current variation. One small sized motor having shunt motor characteristics is a permanent magnet field motor with the armature winding being excited by DC through brushes and a commutator.

The electrical circuit 14 in the pump control system 11 includes the voltage source 20 having a positive terminal 21 and a negative terminal 22. The positive terminal 21 is connected through an on-off switch 35 and a conductor 23 to the positive terminal of the motor 13 and the negative terminal of the motor 13 is connected through a conductor 24 and a high-low switch 25 to the negative terminal 22 of the source 20. In the high position of this switch 25, the rest of the electrical circuit 14 is inoperative and in the low position shown, the complete electrical circuit becomes operative. This electrical circuit 14 includes a semi-conductor specifically a transistor 28 which is a power transistor capable of carrying the armature current of the motor 13. A biasing circuit 29 is provided for the transistor 28 and includes a potentiometer voltage divider 30 connected across the DC source 20 and having a movable blade 31 connected to the base of a control transistor 32. Both transistors in this embodiment are of the NPN type and the emitter of transistor 32 is connected to the base of transistor 28, the emitter of that transistor being connected in a common emitter control circuit by being connected to the negative terminal 22 of the DC source 20. The collector of transistor 28 is connected through conductor 24 to the negative terminal of the motor 13 and the collector of transistor 32 is connected to the positive terminal 21 of the source 20. A breakdown diode such as a Zener diode 34 is connected across the collector and emitter of the transistor 28. PNP transistors may be used as an alternative to the NPN transistors, in which case the polarities of the elements in the circuit 14 would be reversed.

OPERATION

The pump control system 11 may be used in many different fluid systems such as coolant systems, hydraulic systems and the like, but is shown in FIG. 1 for purposes of illustration only, as being applied to a fuel boost pump system for use with aircraft engines and the like. With the on-off switch 35 closed, the circuit 14 is rendered operative and with the high-low switch 25 in the low position, then the two transistors 28 and 32 will control the energization of the motor 13. The semi-conductors and specifically the transistor 28 is connected in the circuit 14 to have current flow through the motor 13 dependent on the current flow through the transistor 28. To accomplish this, the transistor 28 is biased by the biasing circuit 29 which includes the control transistor 32 and the potentiometer 30. Moving the movable blade 31 downwardly toward the positive terminal 21 increases the conductivity of this control transistor 32 and increases the positive current flow to the base of the power transistor 28. This flow goes from base to emitter of this transistor to increasingly turn it on and hence increase the conductivity so that current from collector to emitter of this transistor 28 is increased. This increasing conductivity decreases the voltage drop across the collector and emitter of the transistor 28 and increases the voltage applied to the armature of the motor 13. Accordingly the speed thereof increases and since the pump 12 is a positive displacement pump, the flow thereof increases. In one specific embodiment, the system is designed to operate from a 28 volt DC supply such as is commonly used in aircraft. Also the pressure relief valve is set at 45 p.s.i. as a safety measure to protect the system.

The Federal Aviation Authority requires that aircraft fuel pumps have rated capacities exceeding the actual flow rate required by the engine. With the high-low switch 25 set at high, the pump meets the Federal Aviation Authority's minimum flow requirement of 62½ gallons per hour at 30 p.s.i. Flow not used by the engine is bypassed over this relief valve 18 at its setting of 45 p.s.i. maximum. The motor 13 in this one embodiment operated in the high setting at approximately 4,000 r.p.m. and 4.0 amperes. This operation is shown in FIG. 6 with the flow being shown by a curve 38, the pressure in pounds per square inch reference to atmosphere shown by a curve 39 and the amperes taken by the motor shown by a curve 40, all plotted with reference to altitude in feet. This flow curve 38 shows that the system operates up to approximately 24,500 feet of altitude at which time the pump flow is disrupted and becomes erratic generally because of cavitation at the pump inlet caused by the reduced atmospheric pressure on the fuel in the tank 17. This system has two difficulties, one the considerable pressure reduction at the pump inlet by the high pump speed and the reduced atmospheric pressure and also the considerable heating, agitation and recirculation of the fluid fuel as recirculated through the pressure relief valve 18.

The present invention presents a solution to this problem of limited altitude capability of the system by providing the high-low switch 25 and the electrical circuit 14 including the semi-conductors 28 and 32. After take-off, the booster pump switch or high-low switch 25 is thrown to the low position. In this position the discharge pressure of the pump 12 is controlled at a substantially constant pressure above ambient pressure by the circuit 14.

Figure 5:
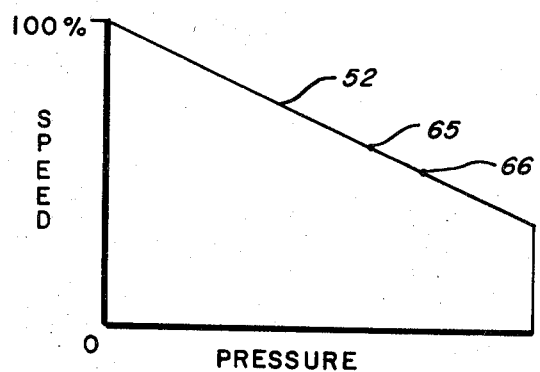

FIGS. 2–5 are graphs of performance characteristics and FIG. 2 shows a curve 42 of pressure versus demand or flow of the fluid from the outlet of the pump 12. Since the pump 12 is one which has increasing pumped displacement with increasing speed and specifically is a positive displacement pump, then if the engine should be throttled back to increase the back pressure by reducing the engine's fuel requirements, then the pressure on the outlet of the pump 12 will increase, and this curve 42 shows that as the demand decreases the pressure on the outlet of the pump increases. A portion 43 of the curve shows that the pressure is held constant at some maximum setting, for example, 45 p.s.i., by the relief valve 18. The maximum fuel required by the engine 16 might be at some point 44 on the curve 42 and the pump 12 would have excess capacity to be able to exceed that flow required by the engine 16. Accordingly with the switch 25 in the high position, the operation of the system would be along the curve 42 between point 44 and the vertical portion 43. FIG. 3 shows a curve 46 of torque versus pressure and a curve 47 of current versus pressure. As the pressure on the outlet of the pump 12 increases, the torque required to drive this pump also necessarily increases. As the torque input of the pump 12 and the torque output of the motor 13 increase, then the current to the motor 13 also necessarily increases as shown by the curve 47 being generally parallel to the curve 46. FIG. 4 is a plot of voltage versus pressure and the upper line 49 shows the battery voltage, in this case taken as 28 volts. The curve 50 departs from the line 49 by sloping downwardly and the voltage between the lines 49 and 50 represent the voltage across the transistor 28 for any given pressure. A curve 51 departs from the curve 50 and the voltage between these two curves 50 and 51 at any given pressure represents the IR drop across the armature of motor 13 for any given pressure. The voltage between the zero voltage line and the curve 51 thus represents the voltage which remains and this is the back E.M.F. For any given motor the torque can be expressed as:

$$\text{Torque} = \text{constant} \times \phi I_a \tag{1}$$

where $\phi$ equals the flux per pole and $I_a$ equals the armature current. Also for any given motor the speed may be expressed as:

$$R.P.M. = \frac{\text{constant} \times (E_a - I_a R_m)}{\phi} \quad (2)$$

where $E_a$ is the applied voltage and $I_a R_m$ equals the IR drop in the windings of the motor armature. Also the expression $E_a - I_a R_m = E_b$ or the back E.M.F. of the motor 13. Since the speed of the motor is proportional to the back E.M.F., assuming constant flux which one has with a permanent magnet motor, then FIG. 5 shows a curve 52 of the speed plotted versus pressure. This shows that the speed drops off faster than either the voltage drop across the transistor 28 or the IR drop across the motor 13 and in fact decreases proportionally to both of these factors in combination.

Now assume that after take-off the high-low switch 25 is thrown to the low position to place the circuit 14 into operation. Also assume that the particular engine conditions of throttle setting are at the point 55 on the demand versus pressure curve 42. Now if the engine is throttled back, the demand for fuel is decreased and the pressure will increase toward a point 56 on the curve 42. However this increase of pressure is shown in FIG. 3 to cause an increase of torque requirements from a point 57 to a point 58 on curve 46. Also the current requirements will increase from a point 59 on curve 47 to a point 60. In FIG. 4 it will be seen that the voltage across the transistor increases from a point 61 to a point 62 on curve 50 and the IR drop increases from a point 63 to a point 64 on the curve 51. FIG. 5 shows that the speed-pressure curve 52 changes its operating point from a point 65 toward a point 66 whereat the speed is materially reduced. This reduced speed means that the positive displacement pump 12 has a materially reduced flow output and accordingly in FIG. 2 the new operating point is actually at a point 67 rather than at the point 56. The final result is that the increase in pressure tries to increase the current but instead the current is limited or controlled by the semi-conductor circuit 14 so that the voltage decreases instead, reducing the speed and flow until the flow is just sufficient to maintain the desired constant pressure at the new demand level. Accordingly a load line 68 is developed which is nearly vertical because the pressure is maintained nearly constant despite changes in demand, by changing of the operating point along a family of curves 69 generally parallel to the curve 42. Accordingly the current tends to be maintained nearly constant by operating along a nearly horizontal line 70, but actually moves very little along this line because the load line 68 is nearly vertical.

An increase in demand will decrease the pressure on the outlet of the pump and this reduces the current below the control limit, allowing the voltage and therefore the speed and flow to increase to the point where flow is again sufficient to maintain the constant pressure at the higher flow demand. Voltage will increase across the motor 13 to maintain the substantially constant pressure with increasing flow demand up to the voltage level of the aircraft electrical system and as shown by the point 44 on the curve 42 the pump and motor system has excess capacity to meet the requirements of the engine 16. The voltage across the motor will decrease to compensate for lower flow demands to near the stall speed of the motor. The Zener diode 34 is provided to limit the total amount of collector to emitter voltage on the transistor 28. In the above example, this might be a nine volt Zener diode to limit the voltage drop across this transistor to nine volts so that the terminal applied voltage on the motor 13 would not decrease below 19 volts, so that the system would assure that the motor would not stall.

Accuracy of control is reflected by minimum variations in the desired pressure level and is affected by the degree to which the motor output torque and the pump input torque are constant for a given amperage in the case of the motor, and pressure in the case of the pump, over the entire range of speeds for any particular application. In the one embodiment referred to above, the flow required for full power at altitude was 36.7 gallons per hour resulting in a motor speed of 2700 r.p.m., achieved by a motor input power of 55 watts, just half of the input at the normal 28 volt, 4.0 ampere setting. This means that the life of the motor will obviously be greatly extended by operating under these conditions of half the normal heat input and two-thirds the normal speed. The voltage drop, and current limit or control are accomplished by reliable solid state components which are small and compact and light in weight.

The movable blade 31 of the potentiometer 30 is available to change the pressure setting of the fluid being pumped. If the movable blade 31 is moved downwardly as viewed in FIG. 1, this biases the base of transistor 32 more positively turning it on more and accordingly the base of transistor 28 is biased more positively to also turn it on. This decreases the voltage across the transistor and increases the voltage across the motor 13 to increase the flow and hence the pressure. Accordingly potentiometer 30 may be considered a pressure setting levice to change the horizontal position of the load line 68 in the curves of FIG. 2.

This type of pump may be submerged in the fuel tank to meet the long life requirements of a tank mounted unit and still be capable when switched to the high setting of switch 25 of meeting full Federal Aviation Authority requirements, thus eliminating the need for the more expensive three pump systems sometimes used in the prior art. This pump control system 11 also results in a marked increase in altitude performance when operating in low condition as shown by the curves of FIG. 7. This figure shows the curve 72 of flow, a curve 73 of pressure in p.s.i. reference to atmosphere, and a curve 74 of voltage to the pump, all plotted against altitude in feet. This shows that the pump was operative up to about 38,000 feet altitude maintaining sufficient flow and sufficient pressure. This marked increase in altitude performance results from the lower speed of the motor and because bypass by the relief valve is entirely eliminated thus minimizing vapor formation. The present system is a considerable improvement over the prior art which tends to vaporize the fuel by use of an oversized pumping element bypassing through the relief valve which then must either incorporate a vapor separator, a vapor return line and/or attempt to force the vapor back into the fuel by repressurization.

The pump control system automatically senses the tendency for pressure change with changes in flow demand and the tendency for current changes are automatically changed into changes in voltage on the pump to increase or decrease the speed thereof as needed and this automatic control is achieved without any feedback from the motor 13 or pump 12.

It will be noted that the circuit 14 employs the transistor 28 in a common emitter circuit namely the emitter is common to both the input and output circuits. In such common emitter configuration the substantially constant current characteristics of such a circuit help the pump control system 11 maintain a substantially constant current as the speed and flow are changed to automatically meet the changing requirements.

Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A fluid pump control system therefor including, in combination,
    a pump having an inlet side and an outlet side, said pump having an increasing pumped displacement with increasing speed, conduit means at the outlet side of said pump for transporting fluid to a load, an electric motor connected to said pump for driving the same, said electric motor having a decreasing speed with a decreasing applied voltage, and electrical circuit means for driving and controlling said motor including non-feedback first means responsive to an increase in pressure at said outlet of said pump to cause a decrease in motor applied voltage thereby reducing motor speed.

2. A control system as set forth in claim 1, wherein said pump is a positive displacement pump.

3. A control system as set forth in claim 2, wherein said pump has an essentially linear pressure-torque relationship over a wide speed range.

4. A control system as set forth in claim 1, including a sump, and a relief valve connected on the outlet side of said pump for diverting excess fluid to said sump.

5. A control system as set forth in claim 1, wherein said electric motor has an essentially linear speed-torque relationship over a wide range of motor speeds with minimum current variation.

6. A control system as set forth in claim 5, wherein said motor is a DC permanent magnet field motor.

7. A control system as set forth in claim 1, wherein said electrical circuit means includes a semiconductor connected in circuit with the motor to have current flow through the motor dependent on the current flow through the semiconductor.

8. A control system as set forth in claim 7, wherein said semiconductor is a transistor.

9. A control system as set forth in claim 8, wherein said transistor is connected in series between said electric motor and a voltage source energizing the motor.

10. A control system as set forth in claim 9, wherein said voltage source is a DC source.

11. A control system as set forth in claim 10, including biasing means connected on the input of said transistor for applying a control bias signal thereto to establish a predeterminable conductivity of said transistor.

12. A control system as set forth in claim 11, wherein said biasing means includes a control transistor and a voltage divider connected to establish a bias on the control transistor in turn supplying a bias on the first mentioned transistor, whereby a reduced demand for fluid flow to the load causes an increase in back pressure on the outlet of the pump and causes an increased torque requirement of the motor and an increase in motor current and said electrical circuit means in response to said increase in said motor current increases the voltage drop across the series connected transistor and increases the IR drop in the motor to materially reduce the motor speed and the fluid flow output of the pump to maintain a substantially constant current requirement of the motor and a substantially constant pressure of the output of the pump.

13. A control system as set forth in claim 8, including a breakdown diode connected across said series connected transistor.

14. A control system as set forth in claim 8, including an electric circuit disabling switch connected across said series connected transistor.

15. A control system as set forth in claim 11, including means connecting said transistor in a common emitter circuit to aid in maintaining a substantially constant current.

16. A fuel pump and control system therefor including, in combination, a positive displacement pump having an inlet side and an outlet side, said pump having an essentially linear pressure-torque relationship over a wide speed range, a sump, a relief valve on said outlet side for diverting excess fuel to said sump, conduit means at the outlet side of said pump for transporting fuel to an engine having variable requirements, an electric motor connected to said pump for rotatably driving the same, said electric motor having an essentially linear torque-speed relationship over a wide range of motor speeds with minimum current variation, an electrical circuit means for driving and controlling said motor including a transistor connected to control current to said motor whereby an increase in pressure at said outlet side of said pump reflects a lower flow demand by the engine and causes an increased torque requirement on said motor and an increase in motor current and said circuit means in response to said increase in motor current causes a voltage drop across said transistor thereby reducing motor speed and the amount of fuel pumped by said pump, and whereby a decrease in pressure at said outlet side of said pump reflects a higher flow demand by the engine and causes a decreased torque requirement on said motor and a decrease in motor current and said circuit means in response to said decrease in motor current causes a voltage increase to the motor thereby increasing motor speed and the amount of fuel pumped by said pump.

17. The method of using a semiconductor in controlling an electric motor driven pump which has increased fluid output flow with increased speed and the motor having increased speed with increased voltage applied from a source, the fluid being supplied to a load having increasing back pressure with decreasing fluid requirements, said method comprising the steps of, connecting the semiconductor and motor in circuit with a voltage source, connecting the semiconductor in said circuit to have current flow through the motor dependent on the current flow through the semiconductor, and applying a controlled bias signal to the semiconductor to establish a predeterminable conductivity of the semiconductor to control the motor responsive to increasing back pressure of the load to cause a decrease in motor applied voltage thereby reducing motor speed.

18. The method as set forth in claim 17, wherein the pump is a positive displacement pump.

19. The method as set forth in claim 18, wherein the pump has an essentially linear pressure-torque relationship over a wide speed range.

20. The method as set forth in claim 17, including relieving excess fluid pressure on the outlet side of the pump.

21. The method as set forth in claim 17, wherein the electric motor has an essentially linear speed-torque relationship over a wide range of motor speeds with minimum current variation.

22. The method as set forth in claim 21, wherein the motor is a DC permanent magnet field motor.

23. The method as set forth in claim 17, wherein the semiconductor is a transistor.

24. The method as set forth in claim 23, including connecting said transistor to have substantially all of the motor current flow through said transistor.

25. The method as set forth in claim 17, wherein the voltage source is a DC source.

26. The method as set forth in claim 24, including biasing the input of said transistor to establish a predeterminable conductivity of said transistor.

27. The method as set forth in claim 26, wherein said circuit includes a control transistor and a voltage divider, and including connecting said voltage divider to establish a bias on the control transistor, and supplying a bias from the control transistor to the first mentioned transistor, whereby a reduced requirement of the load for fluid flow causes an increase in back pressure on the outlet of the pump and causes an increased torque requirement of the motor and an increase in motor current and said circuit in response to said increase in said motor current increases the voltage drop across the first-mentioned transistor and increases the IR drop in the motor to reduce the motor speed and the fluid flow output of the pump to maintain a substantially constant current requirement of the motor and a substantially constant pressure on the outlet of the pump.

28. A control system as set forth in claim 27, including limiting the maximum voltage drop across said first-mentioned transistor.

References Cited
UNITED STATES PATENTS

| | | | |
|---|---|---|---|
| 2,950,682 | 8/1960 | Kimmel | 103—35X |
| 3,119,552 | 1/1964 | Thomann | 230—12X |
| 3,123,005 | 3/1964 | Bredehoeft et al. | 103—35 |
| 3,125,856 | 3/1964 | Branson et al. | 103—41X |
| 3,393,642 | 7/1968 | Kordik et al. | 103—35 |
| 3,439,622 | 4/1969 | Welty et al. | 103—35 |

CORNELIUS J. HUSAR, Primary Examiner